United States Patent
Mikulak et al.

(10) Patent No.: US 11,825,531 B2
(45) Date of Patent: Nov. 21, 2023

(54) WIRELESS CROSS PAIRING RESOLUTION ON INTERCONNECTED DEVICES

(71) Applicant: Safran Passenger Innovations, LLC, Brea, CA (US)

(72) Inventors: Steven Mikulak, Brea, CA (US); Randall Bird, Brea, CA (US); Tinku Rasheed, Gilching (DE); Jeffrey David White, Brea, CA (US)

(73) Assignee: Safran Passenger Innovations, LLC, Brea, CA (US)

( * ) Notice: Subject to any disclaimer, the term of this patent is extended or adjusted under 35 U.S.C. 154(b) by 0 days.

(21) Appl. No.: 17/799,783

(22) PCT Filed: Feb. 19, 2021

(86) PCT No.: PCT/US2021/018707
§ 371 (c)(1),
(2) Date: Aug. 15, 2022

(87) PCT Pub. No.: WO2021/168195
PCT Pub. Date: Aug. 26, 2021

(65) Prior Publication Data
US 2023/0078717 A1 Mar. 16, 2023

Related U.S. Application Data

(60) Provisional application No. 62/979,074, filed on Feb. 20, 2020.

(51) Int. Cl.
*H04W 4/80* (2018.01)
*H04W 76/10* (2018.01)

(52) U.S. Cl.
CPC ............. *H04W 76/10* (2018.02); *H04W 4/80* (2018.02)

(58) Field of Classification Search
CPC ................................ H04W 4/80; H04W 76/10
See application file for complete search history.

(56) References Cited

U.S. PATENT DOCUMENTS

| | | |
|---|---|---|
| 2006/0251256 A1 | 11/2006 | Asokan et al. |
| 2013/0171939 A1 | 7/2013 | Tian et al. |
| 2015/0318874 A1 * | 11/2015 | Donaldson ............... H04B 1/00 367/135 |
| 2016/0294485 A1 * | 10/2016 | Ma ........................ H04W 76/14 |

FOREIGN PATENT DOCUMENTS

EP 2925038 B1 10/2017

OTHER PUBLICATIONS

PCT International Search Report and Written Opinion, International Application No. PCT/US2021/018707; International Filing Date Feb. 19, 2021, 11 pages.

* cited by examiner

*Primary Examiner* — Tuan H Nguyen
(74) *Attorney, Agent, or Firm* — Ryan Dean; Umberg Zipser LLP (57) ABSTRACT

Systems and methods are described herein for pairing wireless peripherals with networked devices. Knowledge of the location of the networked devices can be used to properly route or transmit audio to paired wireless peripherals, regardless of whether the wireless peripherals are paired with the correct networked devices provided they are networked with other potential devices. This can be accomplished by prompting users to select an input based on an audio challenge to determine which of the wireless peripherals should be mapped to which of the networked hosts.

15 Claims, 5 Drawing Sheets

WIRELESS CROSS PAIRING RESOLUTION ON INTERCONNECTED DEVICES

This application claims priority to U.S. provisional application having Ser. No. 62/979,074 filed on Feb. 20, 2020. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is pairing of devices and wireless peripherals.

BACKGROUND

The following description includes information that may be useful in understanding the present invention. It is not an admission that any of the information provided herein is prior art or relevant to the presently claimed invention, or that any publication specifically or implicitly referenced is prior art.

In environments where many users simultaneously want to pair headsets or other wireless peripherals to audio sources or other networked devices, such as seat back display units of an in-flight entertainment systems on an airplane, it can be complex to ensure that each peripheral is paired with the desired audio source. On an airplane, for example, each seat back display unit can have a wireless transceiver to be paired with a peripheral of the user sitting in the associated seat for that display unit. However, cross pairing with an incorrect screen is possible because headsets and other peripherals often do not have a display. Instead, pairing typically relies on matching names and identification numbers associated with the peripherals which may not always be obvious or known to the users.

Pairing of headphones (speaker or headset) or other peripherals to audio source using the Bluetooth® protocol typically involves initiating the pairing sequence by pressing a discover button on the audio source and entering discovery mode. Next the user is required to select a Bluetooth® capable peripheral name or BT_ADDR (MAC address) from a list on the audio source. However, the BT_ADDR and peripheral name convention is cryptic. Names and numbers can be similar if people have the same brand of peripherals, for example. Once a selection is made, validation typically involves the user with the peripheral enter a generic PIN, such as 0000 or 1234, and the connection is then complete. These steps work when pairing operations are infrequent and physically distanced since the population of devices to choose from is low.

In an aircraft or other vehicle or room full of users, many of whom may be pairing peripherals at the same time, this approach is impractical. The likelihood of cross-pairings (incorrect matches between audio sources and peripherals) greatly increases due to the common or unknown peripheral names, BT_ADDRs and so forth.

While others have attempted to address this issue, those solutions all suffer from one or more disadvantages. For example, U.S. patent publication no. 2016/0029154 discusses using a barcode to assist in the pairing process. However, such concept is not widely used in consumer devices, and would not appear to work with pre-existing devices that lack scanners.

In another example, described in U.S. Pat. No. 7,831,207, a user is required to enter a challenge digit or code to authenticate a connection. If an incorrect code is entered, the pairing of the device is aborted. While such process can ensure that an incorrect device is not paired, the process does not facilitate pairing of devices in a crowded space where many similar peripheral names are shown, and the user does not know which to select.

Other potential solutions are described in U.S. patent publication no. 2016/0360350 and WIPO publication no. 2016/168409, which discuss automatic pairing of a device by utilizing a user's account to connect devices registered to the account through different means.

The above concepts are thus all directed to ensuring a correct pairing is made but fail to address the problems that exist when trying to connect multiple devices in a crowded area.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for improved processes for pairing wireless devices with sources.

SUMMARY OF THE INVENTION

The inventive subject matter provides apparatus, systems and methods for simplified pairing of networked devices with wireless peripherals. The inventive subject matter is applicable anywhere users desire to pair wireless peripherals having a limited interface with networked devices that have a rich interface. Such systems and methods can be configured to work in a variety of locations including, for example, aircraft, busses, trains, cars, ferries and other boats, and other vehicles, as well as theatres, classrooms, theme parks and other public spaces or buildings where multiple displays or other networked devices may be present and there is a need to pair wireless headsets or other peripherals with the networked devices.

The inventive subject matter seeks to solve the above problems by utilizing network abstraction of networked devices acting as audio sources along with a challenge system to match an audio challenge heard on a pair of headphones or other challenge presented on different types of wireless peripherals to displayed content on the networked device irrespective of a physical paired link.

Contemplated systems and methods described herein can advantageously permit pairing of two or more wireless peripherals without knowing the identifications of the peripherals. Thus, each of the wireless peripherals can pair with a unique source device (i.e. networked device) without knowing whether the pairing is ultimately correct. To accomplish this, software algorithms analyze received data to determine which networked devices and wireless peripherals should be paired. Although the below description references pairings via the Bluetooth® protocol, it is contemplated that the systems and methods could be equally applicable to pairing of devices and wireless peripherals via other wireless protocols, as the problem occurs due to the mass pairing of devices and peripherals.

Such data may include, for example, a timing of cues (e.g., pressing of "pair" button), a signal strength of the transmitter, and a peripheral name or BT_ADDR selected by the user. Thus, the systems and methods described herein can make a best guess about which headset or other wireless peripheral should be paired with which networked device on an aircraft, for example. This is especially advantageous in aircraft where there may be hundreds of networked devices on the aircraft, all of which may each need to be paired with a wireless peripheral during the flight. The systems and methods can therefore facilitate pairing of wireless peripherals and networked devices to simplify the process for users.

After at least some of the networked devices are paired with a wireless peripheral, the system can be configured to abstract audio and video such that the network can transmit audio associated with any networked device (such as seatback mounted display units having display screens) to any wireless peripheral (such as headphones). Once paired, the system can challenge each user connection with some unique code sequence (shapes, numbers, etc.), which may, for example, be displayed on a component of the networked device such as a display screen. Once users respond to the queries, the system may remap audio transmission based on the received responses, such that the wireless peripheral receives the correct audio from the networked device paired with the wireless peripheral. In this manner, even if a wireless peripheral isn't paired with the correct networked device, the wireless peripheral can still receive the correct audio transmission for the video being presented on the networked device (e.g., seatback display unit) in front of the user, for example.

As used herein, the term "pair" or "pairing" is used to mean the process to establish a peer-to-peer wireless connection between a networked device and a wireless peripheral such as that established usually using the Bluetooth® protocol. As used herein, the term "match" means the audio path for a pair and is used to indicate audio associated with a given networked device is routed to a set of headphones worn by the passenger (or other wireless peripheral). A passenger may be paired to a transmitter of a networked device several rows away, but the audio link is only a match if the sound on the passenger's headphones is representative of activity on the networked device that the passenger intends to view.

The inventive subject matter discussed herein advantageously leverages intelligence and capabilities of a networked system to properly route or transmit audio to paired wireless peripherals, regardless of whether the wireless peripherals are paired with the correct networked devices. Many wireless transceivers act as audio sources that can communicate with one another and audio can be mapped and synchronized to any networked device over wired and wireless networked infrastructure from a server, for example, or from another of the networked devices.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figure 1:
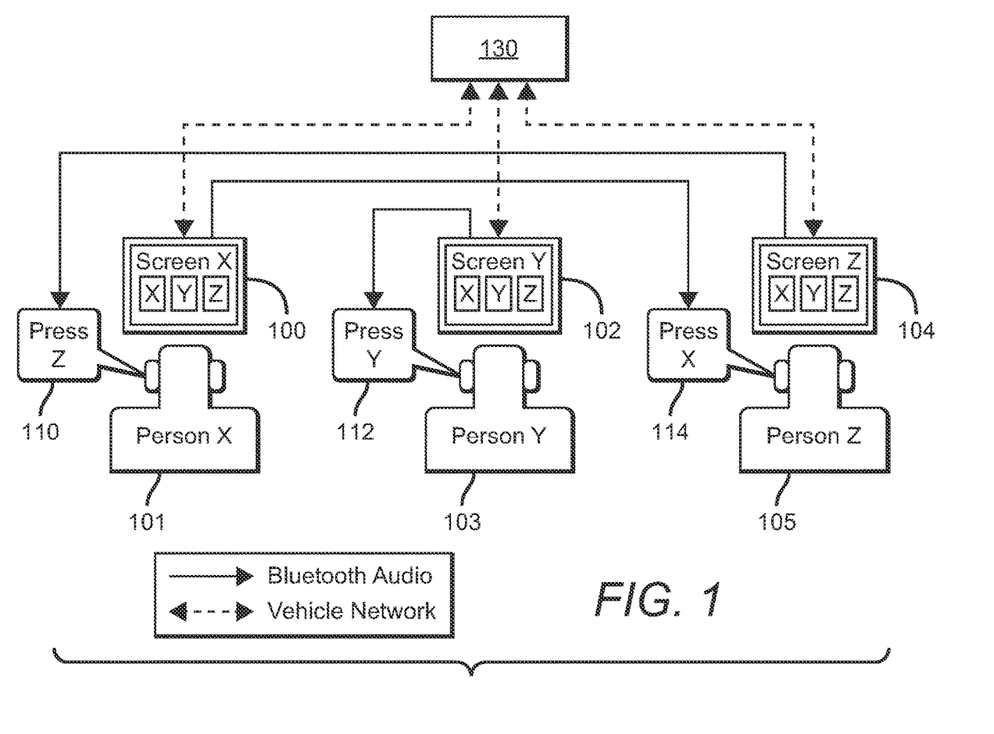
FIG. 1 illustrates a diagram showing audio challenges transmitted to users after an initial pairing.
Figure 2:
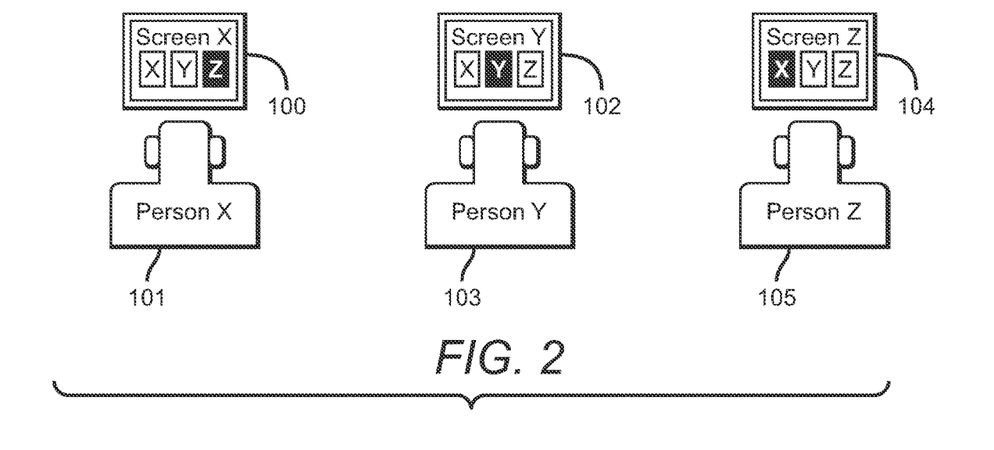
FIG. 2 illustrates a diagram showing users inputting a response after receiving the audio challenges.
Figure 3:
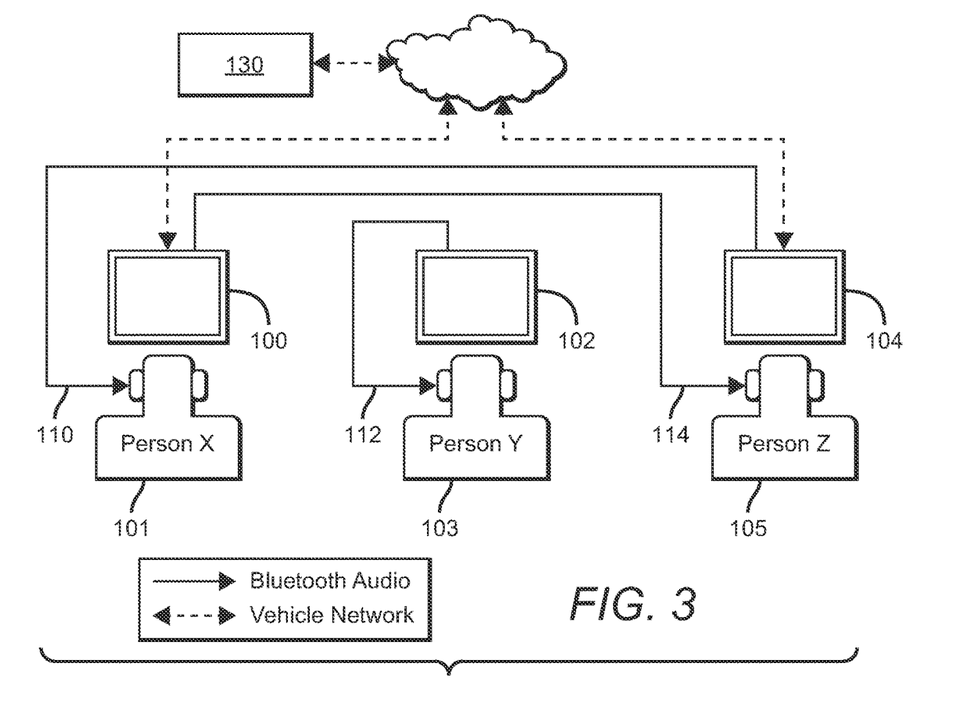
FIG. 3 illustrates a diagram showing remapping of audio transmissions based on the users' inputs.

In FIGS. 1-3, three users/persons are shown, each of whom has a display screen in front of them that is coupled to a display unit configured to present content on the display screen.

Each of the display units is a component of a networked device that can be communicatively coupled with a server 130, as shown, and/or with one another. Although a central server is shown, it is contemplated that the systems and methods herein could be used without a centralized server. For example, the server as used herein could be ad-hoc or mesh in nature, and reside on one or more of the networked devices.

As shown in the Figures, person X is intending to pair headset 101 with networked device 100, person Y is intending to pair headset 103 with networked device 102, and person Z is intending to pair headset 105 with networked device 104.

Although headsets are shown and described below, any wireless peripheral could alternatively be used that requires pairing with a networked device without departing from the scope of invention herein.

During pairing, each of the networked devices 100, 102 and 104 may associate to one of headsets 101, 103 and 105 arbitrarily or by best guess. In some embodiments, users can initiate pairing from the display screen of the networked device in front of them. Users can select a headset or other wireless peripheral that they believe is correct or the wireless peripherals could be paired arbitrarily or by best guess from available data such as passenger headset selection, time of pairing and signal strength, for example. Incorrect pairings between networked devices and headsets or other wireless peripherals are expected because the initial pairings may occur without requiring any initial determination whether the pairings are correct. As shown in FIG. 1, the pairings for person X and person Z are swapped (e.g., unintended matches), where headset 101 is paired with networked device 104 and headset 105 is paired with networked device 100.

Headset 103 is correctly paired with networked device 102 (e.g., an intended match).

Once the initial pairings are completed, remapping of audio transmission can occur using one or more methods described below.

At this point, server 130 does not know which networked device is paired with which user's headset. To determine this, the server 130 can transmit a command via a wired or wireless network to each of the networked devices 100, 102 and 104 to present an input request such as "XYZ" shown in FIG. 1. Although each of the networked devices 100, 102 and 104 are shown to display the same input request, it is contemplated that the specific request could vary between one or more of the networked devices 100, 102 and 104. Furthermore, although alphabetical letters are shown, it is contemplated that any combination of objects, symbols, colors or otherwise could be shown so long as the user can be prompted to select among those shown. In some embodiments, a single object such as an arrow could be shown pointing in different directions. In other embodiments, it is contemplated that the user could be prompted to input something according to a request, which could be drawing a letter or number, swiping in a certain direction and so forth.

Next, users can receive one or more audio challenges. It is contemplated that the audio challenge could comprise a unique challenge between the users. As shown in FIG. 1, person X receives the audio challenge "Press Z" in headset 101 via audio path 110, person Y receives the audio challenge "Press Y" in headset 103 via audio path 112, and person Z receives the audio challenge "Press X" in headset 105 via audio path 114. However, where there are a large number of users, it is contemplated that some of the users may receive the same audio challenge. However, in such circumstances, the timing of the challenge could be varied to assist the system to determine which networked device and user's wireless peripheral should be paired and/or the determination could be based on signal strength and other factors.

As shown in FIG. 2, the users respond to the audio challenges by inputting a selection via a touch screen or other input on the networked device in front of them. As shown, person X has inputted "Z", person Y has inputted "Y" and person Z has inputted "X".

These inputs by the users into their respective networked device provide feedback to the server 130, which allows server 130 or other component of the networked equipment, including but not limited to networked devices 100, 102 and 104, to associate each user with the networked device associated with the user's seat. Where one or more of the networked devices comprises server 130, it is contemplated that the inputs allow the networked device(s) acting as server to associate each user with the networked device associated with their seat. Thus, depending on the number of networked devices and the network architecture, it is contemplated that system could have a plurality of servers that work to associate each user with the networked device associated with the user's seat.

It is contemplated that multiple audio challenges could be used to further eliminate conflicts as needed until all active headphones or other wireless peripherals and networked devices are matched with an acceptable level of confidence.

To accomplish this, the audio for each user can continue to be transmitted from the networked device with which the user initially paired, but with content synchronized to the local networked device of the user (e.g., the networked device disposed in front of the user) via server 130. For example, FIG. 3 illustrates networked device 100 transmitting audio to headset 105 of person Z and the content on display 104 synchronized with the audio transmitted from networked device 100. Similarly, networked device 104 can transmit audio to headset 101 of person X. Thus, persons X and Z continue to receive audio transmissions from networked devices that are not associated with their seats (remote sources) but with content synchronized via the network to the local networked device of the user. Although FIG. 3 illustrates that the network audio can be wireless transferred from server 130 to the specific networked device, wired connections are also contemplated.

Users may be unaware that they may not be connected directly to their screen, they are just following instructions during the setup process and when it is finished the audio is matched. Advantageously, the user does not need to know specifics of the user's peripheral such as the wireless peripheral name, BT_ADDR or pin. Rather, the user is only required to select the correct entry when requested by the audio challenge.

Figure 4:
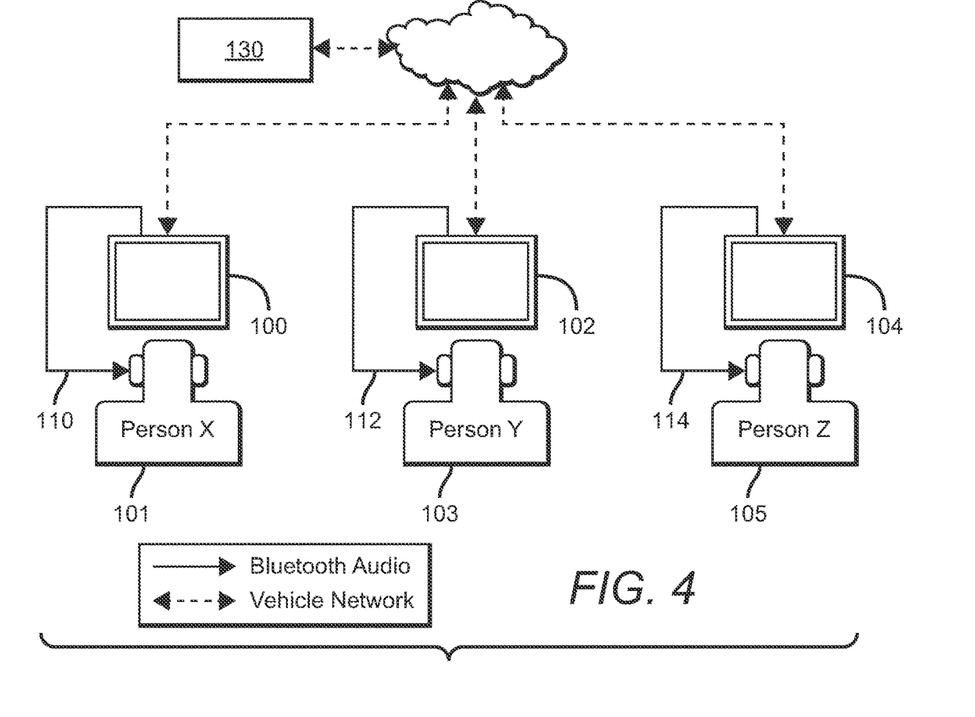
FIG. 4 illustrates a diagram showing relinking of wireless peripherals based on the users' inputs.

Alternatively, the audio can be remapped such that the local networked device transmits audio to the user in an optimal configuration. For example, as shown in FIG. 4, the server 130 can cause the audio to be remapped based on the user's inputs. Thus, for example, because person X entered "Z" into networked device 100, the server 130 determines that headset 101 is paired with an unintended match with an incorrect networked device, and likely networked device 104 in this example. Similarly, because person Z entered "X" into networked device 104, the server 130 determines that headset 105 is paired with an unintended match with an incorrect networked device, and likely networked device 100. The server 130 would also determine that headset 103 is likely paired with the intended match to networked device 102 based on person Y inputting "Y" into networked device 102.

The server 130 can then intelligently relink the wireless pairing between networked devices and wireless peripherals. In this example, once the server 130 determines which headset should be associated with which networked device, the server 130 can remap audio transmission from networked device 100 to person X and networked device 104 to person Z. This can occur by the server 130 causing the wireless connections to be delinked, and then relinking the wireless peripheral to be paired with one of the networked devices based on shortest distance, for example (i.e., the nearest networked device). Thus, persons X and Z would no longer be receiving audio transmissions from networked devices different from the networked device disposed in front of them.

Server 130 can utilize various methods including those discussed above to determine which headset or other wireless peripheral should be linked with which networked device. For example, using intelligent relink, the server 130 knows the identifier of each headset and each device's mac address or other identifier. The server 130 can remove wireless links and re-establish them to optimize for minimal RF distance. It is contemplated that the server 130 may then prompt the user with another challenge using one or more audio challenges. Using the users' inputs, matches can be determined for each headset. If a match is not determined for a specific headset, the wireless pairing/link can be dropped so that the headset or other wireless peripheral is free to pair to other equipment such as phones and laptops, for example.

After the correct pairings are identified, the server 130 could optionally optimize links of networked devices and wireless peripherals by rerouting connections for best performance or to handle users moving as allowed by the wireless protocol. Such rerouting could occur to reduce interference among the peripherals or due to hardware problems, for example. If automatic swapping is not supported (e.g., the Bluetooth® protocol requires a pairing button to be pressed to place the peripheral in discovery mode), it is contemplated that one or more of the users could receive an audio message to press the pairing button to allow for the desired rerouting. Scenarios where one or more of the networked devices supports the same or different audio to multiple ones of headsets 101, 103, 105 etc. are also contemplated.

Thus, as described above, the systems and methods herein advantageously allow for cross-pairing of networked devices and wireless peripherals to be later fixed through remapping or relinking of networked devices with wireless peripherals such as headsets. In this manner, any pairing can be allowed initially even if incorrect or unintended. Users can then go through the challenge steps to match the user's wireless peripheral to a networked device. In a worst-case scenario, a user may respond incorrectly to the audio challenge. This could result in an incorrect audio feed/transmission, and the user would then need to restart the challenge process. This is a similar penalty compared with traditional pairing; however, the inventive subject matter can vastly minimize incorrect matches as compared to traditional headset pairing techniques.

The examples presented above and in FIGS. 1-4 are simplified examples to show the application of the systems and methods to an incorrect pairings where the pairings each comprises a networked device that is an unintended match to a wireless peripheral and another of the networked devices is the intended match to that wireless peripheral. However, the inventive concepts are not limited only to pairings of networked devices and wireless peripherals but can be scalable to any number of incorrect pairings within range of the transceivers and controlling network. The systems and methods are also not limited to pairing of display screens and headsets within an aircraft. For example, the systems and methods could be used with different networked devices such as audio hubs or wireless speakers that are separate from display screens. They may also be used with VR headsets, Wi-Fi connections, and pairing a user's device such as a tablet PC or smart phone with an in-flight entertainment unit (such as those deployed on aircraft). Of course, the systems and methods could be used with any vehicle or other situation where there is a likelihood that cross-pairing could occur.

Figure 5:
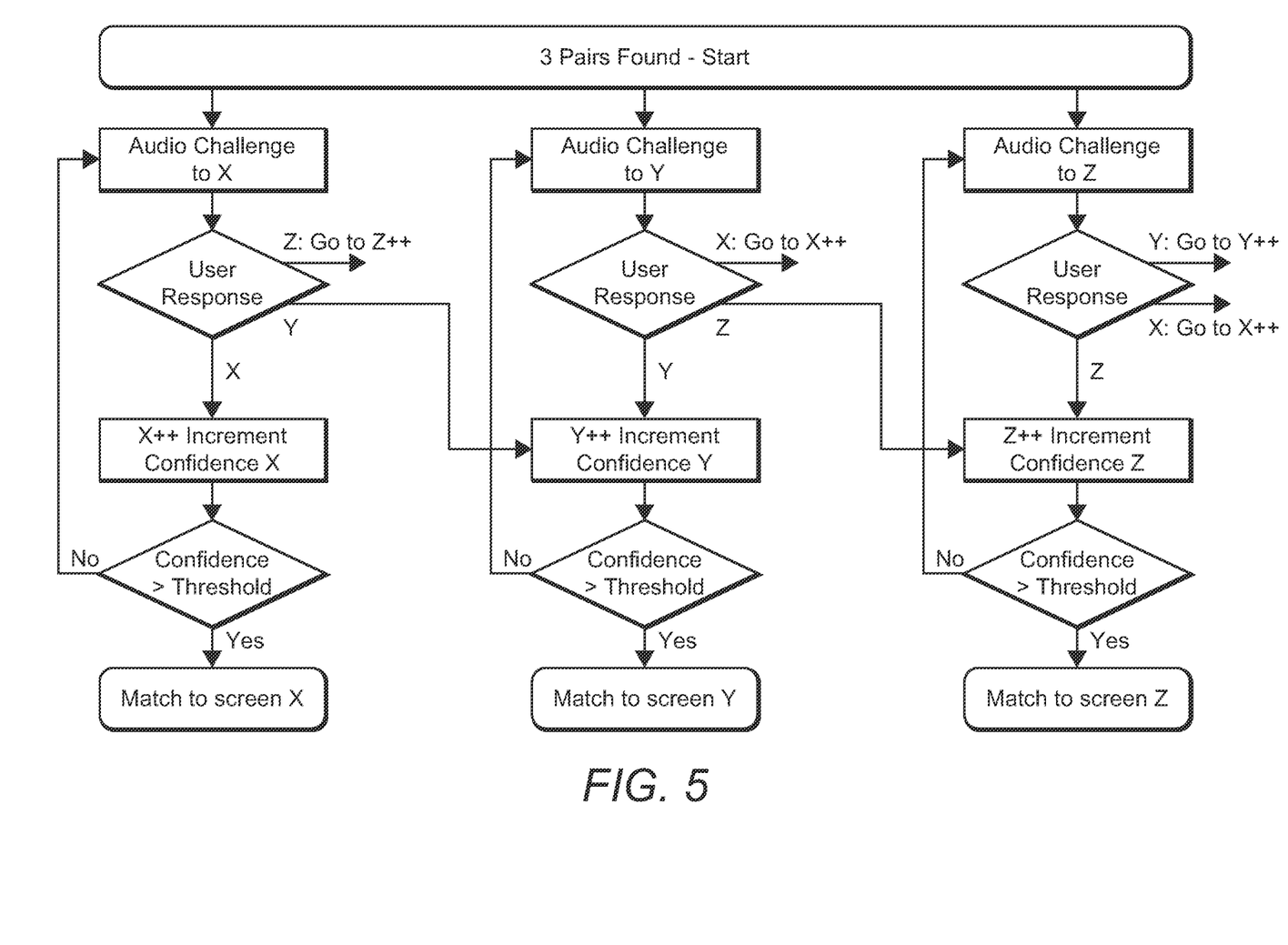
FIGS. 5-6 illustrate various flowcharts of methods for determining matches between wireless peripherals and networked devices.
Figure 6:
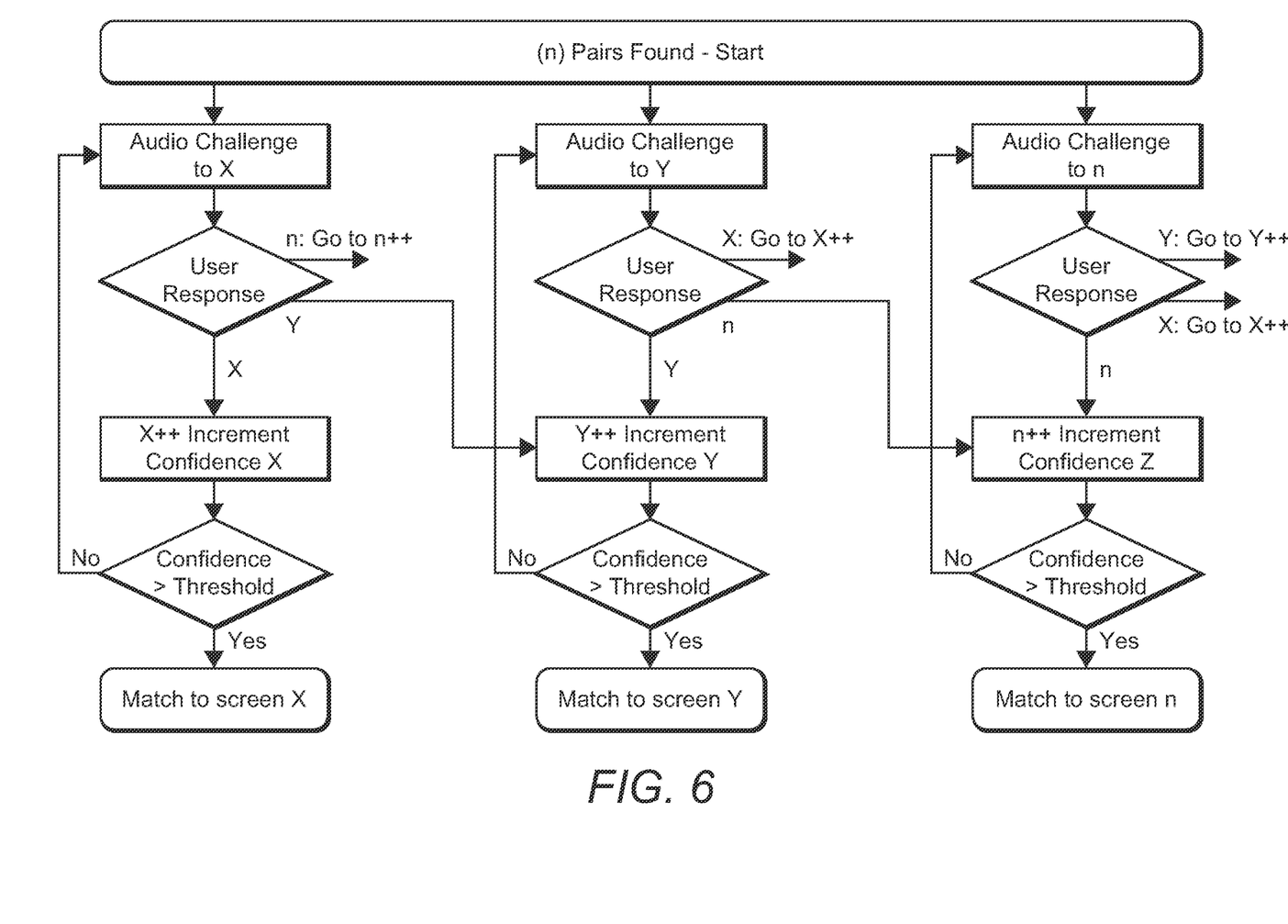

FIG. 5 illustrates one embodiment of a method utilized in the system described above. As shown, there are three wireless peripherals each to be paired to a specific networked device. After the initially pairing, audio challenges can be transmitted to each of the wireless peripherals. After receiving the audio challenge, each user can input a response, preferably into one of the networked devices.

Based on the response received from each user, a confidence value for one or more of the networked devices can be incremented. It is contemplated that the confidence value could be generated based on whether the user's response equals with the expected response, a distance of the wireless peripheral to one or more of the networked devices, signal quality, and other factors. Thus, if person X receives an audio challenge to input "X" and inputs "X", the confidence value for networked device X can be incremented. Similarly, if person X inputs "Y" or "Z", the confidence value for networked device Y or networked device Z, respectively, could instead be incremented.

After receiving the users' inputs, the system checks to see if the confidence value for each pairing exceeds a threshold value. If so, the system determines a match. If not, it is contemplated that the system could transmit another audio challenge to one or more of the users' wireless peripherals until the confidence value exceeds the threshold, or the system could drop the initial pairing. It is contemplated that the confidence threshold could be determined by weighing factors such as user experience, variety of challenges and/or match precision. Higher confidence threshold would typically require a greater number of questions, although with diminishing returns.

Similarly, FIG. 5 illustrates another embodiment of a method utilized in the system described above but with any number of networked devices and wireless peripherals. Initially, one or more pairings (n pairings) of networked devices and wireless peripherals can be created, where n>=1 and the upper boundary is limited only by system resources.

After the initially pairing, audio challenges can be transmitted to each of the wireless peripherals. After receiving the audio challenge, each user can input a response.

Based on the response received from each user, a confidence value for one or more of the networked devices can be incremented. Thus, if person X receives an audio challenge to input "X" and inputs "X", the confidence value for networked device X can be incremented. Similarly, if person X inputs "Y" or "Z", the confidence value for networked device Y or networked device Z, respectively, could instead be incremented.

After receiving the users' inputs, the system checks to see if the confidence value for each pairing exceeds a threshold value. If so, the system determines a match. If the confidence value for each pairing does not exceed the threshold value, it is contemplated that the system could transmit another audio challenge to one or more of the users until the confidence value exceeds the threshold or determine that a match is not found and drop any link between the wireless peripheral and networked device.

In this manner, the systems and methods described above allow audio to be routed to any networked device since the system is networked. It therefore does not matter from which networked device the audio is physically transmitted, only that the user's wireless headphones or other wireless peripheral receives the correct transmission matching the content on the display (networked device) in front of them. Many of the embodiments that follow are strategies that may be optionally used and/or combined to generate matches with as few audio challenges as possible.

Figure 7:
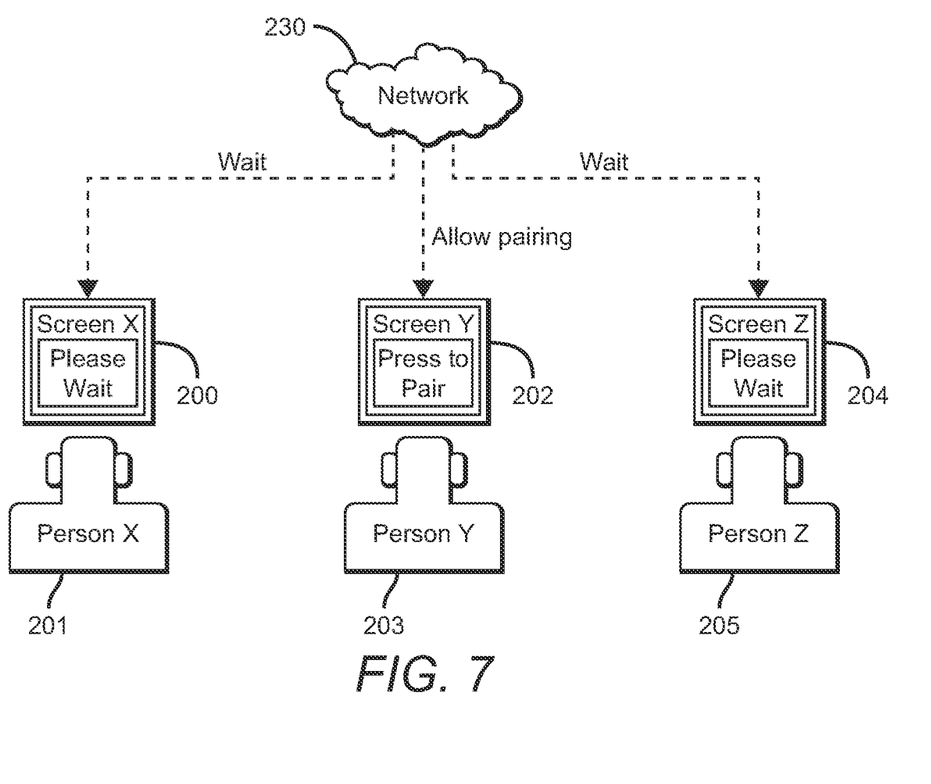
FIG. 7 illustrates a diagram for timeslot pairing of networked devices with wireless peripherals.

FIG. 7 illustrates a time slot approach, where time slots are used to allow pairing on some networked devices but not others. For example, server 230 could be used to organize and assign specific time slots to wireless peripherals for pairing, thereby blocking others from pairing at the same time. As shown in the Figure, server 230 sends a command to permit the wireless peripheral 203 of person Y to pair with networked device 204. Similarly, server 230 can send a command to prevent the wireless peripherals 201 and 205 from being paired during this timeslot.

This approach advantageously limits the number of pairings occurring at the same time by preventing wireless peripherals from initiating simultaneous pairing operations. Of course, where the number of peripherals to be paired is greater or the size of the space where the peripherals are located is larger (such as where interference among the devices and peripherals is less likely or there is a measurable difference in signal strength among those permitted to pair), it is contemplated that more than one networked device/wireless peripheral set could be paired in a single timeslot. However, this approach would not completely prevent cross pairings or incorrect matches because a user could still input something incorrectly or a nearby user could actuate their headphones or other wireless peripheral and establish an incorrect pair or unintended match. It is further contemplated that this approach could be used to supplement the systems and methods described above with respect to FIGS. 1-4. With respect to the remaining numerals in FIG. 7, the same considerations for like components with like numerals of FIG. 1 apply.

In other embodiments, initial pairings of networked devices and wireless peripherals can be made using best guesses based on information such as signal strength and timing (e.g., when an input is received in response to an audio challenge) to pair users' wireless peripherals. Using this approach, the number of incorrect pairings can be reduced by actively determining probable pairings of wireless peripherals and networked devices initially. This could be used to optimize signal quality and narrow the challenge group in the embodiments discussed above.

In another embodiment, a preferred language could be selected by a user at the networked device or otherwise initially before attempting to pair audio, or a default group of languages may be preconfigured based on the flight demographics known to the server. Challenge instructions in a multi-language scenario could simply repeat in all languages configured for actively pairing networked devices and wireless peripherals.

In such embodiments, it is contemplated that the challenge questions may vary by language to aide in the matching process. For example, asking the user in Spanish to press the red button or specific letter, and then asking the same person in English to press the green button or a different letter. However, the scripting of the instructions should consider that some users may be multilingual.

Timing and language could also be used to increase match confidence or make audio prompts faster. If one user always responds during the German instructions in a multi-language set, they are most likely a German speaker and have probably selected that as the language used on their display. This user would no longer require other language prompts if additional challenge questions are required or German language prompts could occur first.

It is also contemplated that a blanking time may be implemented at the outset, during which pairing does not occur automatically to allow users time to manually pair their wireless peripheral. Such an algorithm may be selectively implemented if wireless peripherals or networked devices are discovered to be in pairing mode.

In an aircraft or other vehicle application or otherwise where a user's seating location may be known or the user has an account known to the server or other component of the system, it is contemplated that initial pairing can be streamlined using historic peripheral connection data. Once a user has paired a wireless peripheral and been matched to a networked device in the system, the system can remember the wireless peripheral and associate it with the user for future matching. In such embodiments, it is contemplated that a verification step may still be necessary such as where some users may switch wireless peripherals or seats, and therefore the saved information in the systems may not be accurate.

In a similar manner, it is contemplated that the user could be linked to the server or other component of the system using an app on a user's smartphone or other portable computing device (e.g., smartphone, tablet PC, laptop, smartwatch, and so forth). It is contemplated that the app could have information concerning the user's wireless peripheral. For example, the user's portable computing device could link to the server via a wireless network connection, and the server could ask the user to confirm their seat or other location. Then the server could initiate a pair with the user's wireless peripheral and the networked device at the user's location. This approach could supplement but not replace the above-described systems and methods to again reduce the total number of pairings to be made.

In another embodiment, once a wireless peripheral is linked to the system and its location known, the system could provide for automated or manually prompting to the user to re-pair if the current link is sub-optimal. This would allow the audio source antenna or RF channel to be varied which could improve a poor connection. For the current Bluetooth® protocol this would require the client to press the discover button.

Once networked devices and wireless peripherals are paired, it is contemplated that the server could provide for handoff capabilities of the wireless peripheral match. For example, should a user wish to move to a different seat or other location, the server could be prompted and then the user's wireless peripheral could be rematched to the networked device at the new location. It is important to note that the system and methods described herein do not necessarily prohibit multiple wireless peripherals from being paired with a single networked device. The likely limit will depend on the wireless protocol. For example, in applications using the Bluetooth® protocol, the number of wireless peripherals paired with a single device is typically limited to one or two peripherals (i.e., Bluetooth® 5.0).

It is further contemplated that during the pairing process, the server may automatically connect to wireless peripherals that do not prompt for pin entry, and/or try standard pin codes such as 0000, 1111, 1234, and so forth. If some wireless peripherals fail automatic pairing, part of the challenge prompt could be a request to the user to enter the pin with the assumption the user with the unique pin will input the pin into one of the networked devices. The unique pin response can be considered a correct challenge response and counted as confidence toward generating a match.

It is also contemplated that for those wireless peripherals having a microphone, the system could transmit audio or ultrasonic sounds from one or more of the networked devices that could then be picked up by the microphone of a wireless peripheral. This can help to confirm that a particular wireless peripheral is connected. Similarly, a microphone at the networked device could listen for audio from a nearby wireless peripheral provided the audio is loud enough to be detected by the microphone. Because the system is the source of the audio being transmitted to the wireless peripheral, matches can be made when expected audio is detected by the microphone.

Finally, if the wireless peripheral comprises a camera or photosensitive device (e.g., smart glasses such as those made by GOOGLE and other companies), the networked device could identify itself to the peripheral by visual means, such as barcode, text, color, image, flashing, and so forth.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for pairing of networked devices with wireless peripherals, comprising:
    receiving first information concerning a set of two or more networked devices each configured to transmit audio to one or more connected peripherals;
    receiving second information concerning a set of two or more wireless peripherals;
    analyzing the received first and second information to determine which networked device of the set should be associated with which wireless peripheral;
    generating a set of initial pairings, each pairing between one of the networked devices and one of the wireless peripherals;
    transmitting a unique audio challenge to each of the set of wireless peripherals;
    receiving one or more inputs via the set of networked devices;
    based on the received inputs, generating a set of suggested pairings between one of the networked devices and one of the wireless peripherals and associating a confidence value with each of the suggested pairings; and
    if the confidence value for a suggested pairing exceeds a threshold value, associating the wireless peripheral and the networked device of that pairing;
    wherein the set of suggested pairings is based on a timing of inputs receiving via the set of networked devices, a signal strength of the networked devices at the wireless peripherals, and an initial service set identifier (SSID) selected by a user via the connected networked device.

2. The method of claim 1, wherein each of the networked devices is communicatively coupled with one another.

3. The method of claim 1, wherein the pairing of the wireless peripheral and the networked device of that pairing utilizes the Bluetooth® protocol.

4. The method of claim 1, wherein the set of initial pairings is based on a signal strength of the networked devices and an initial service set identifier (SSID) selected by a user via the connected networked device.

5. The method of claim 1, wherein the step of associating the wireless peripheral and the networked device comprises unlinking and re-pairing a first wireless peripheral of the set and a first networked device of the set.

6. The method of claim 1, wherein the step of associating the wireless peripheral and the networked device comprises determining a location of the wireless peripheral relative to one or more of the networked devices.

7. A method for pairing of networked devices with wireless peripherals, comprising:
    receiving first information concerning a set of two or more networked devices each configured to transmit audio to one or more connected peripherals;
    receiving second information concerning a set of two or more wireless peripherals;
    analyzing the received first and second information to determine which networked device of the set should be associated with which wireless peripheral;

generating a set of initial pairings, each pairing between one of the networked devices and one of the wireless peripherals;
transmitting a unique audio challenge to each of the set of wireless peripherals;
receiving one or more inputs via the set of networked devices;
based on the received inputs, generating a set of suggested pairings between one of the networked devices and one of the wireless peripherals and associating a confidence value with each of the suggested pairings; and
if the confidence value for a suggested pairing exceeds a threshold value, associating the wireless peripheral and the networked device of that pairing;
wherein at least one of the suggested pairings comprises an incorrect pairing, where the suggested pairing comprises a networked device that is an unintended match to the wireless peripheral and another of the networked devices is the intended match;
wherein the step of associating the wireless peripheral and the networked device comprises determining a match to the wireless peripheral relative to one or more of the networked devices; and
for the incorrect pairing, synchronizing an audio transmission from the networked device of the incorrect pair with the networked device that is the intended match to the wireless peripheral; and
mapping an audio transmission from the networked device of the incorrect pair to the wireless peripheral of the incorrect pair based on the synchronization.

8. A system for pairing devices of a network with wireless peripherals, comprising:
a server comprising a processor and memory;
a plurality of networked devices communicatively coupled with the server via a wired or wireless network, wherein the memory stores an approximate location of each of the networked devices, and wherein each of the plurality of networked devices are configured to wireless transmit audio;
wherein the server receives information concerning a set of wireless peripherals each configured to receive audio;
the server analyzes the received information about the set of wireless peripherals to generate a set of initial pairings between one of the plurality of networked devices and one of the wireless peripherals;
the server configured to transmit an audio challenge to each of the wireless peripherals via the wireless connection between each of the wireless peripherals and each of the plurality of networked devices;
wherein the server receives a set of inputs via one or more of the plurality of networked devices in response to the audio challenges;
the server analyzes the set of inputs and generates a set of suggested pairings between one of the plurality of networked devices and one of the wireless peripherals, wherein each of the suggested pairings comprises a confidence value;
for each suggested pairing, if the confidence value for a suggested pairing exceeds a threshold value, the server causes the wireless peripheral and the networked device to be associated;
for each suggested pairing, if the confidence value for a suggested pairing is less than the threshold value, the server causes a second audio challenge to be sent to the wireless peripheral;
wherein the server receives a set of second inputs via one or more of the plurality of networked devices in response to the second audio challenge;
the server analyzes the set of second inputs and revises the confidence value for each of the second set of suggested pairings;
for each of the second set of suggested pairings, if the revised confidence value for a suggested pairing exceeds the threshold value, the server causes the wireless peripheral and the networked device to be associated.

9. The system of claim 8, wherein the associated wireless peripheral and networked device can be paired using the Bluetooth® protocol.

10. The system of claim 8, wherein the set of initial pairings is based on a signal strength of the networked devices and an initial peripheral name or BT_ADDR selected by a user via the connected networked device.

11. The system of claim 8, wherein the set of suggested pairings is based on a timing of inputs receiving via the set of networked devices, a signal strength of the networked devices at the wireless peripherals, and an initial peripheral name or BT_ADDR selected by a user via the connected networked device.

12. The system of claim 8, wherein the step of associating the wireless peripheral and the networked device comprises determining a location of the wireless peripheral relative to one or more of the plurality of networked devices.

13. The system of claim 8, wherein one of the plurality of networked devices comprises the server.

14. A system for pairing devices of a network with wireless peripherals, comprising:
a server comprising a processor and memory;
a plurality of networked devices communicatively coupled with the server via a wired or wireless network, wherein the memory stores an approximate location of each of the networked devices, and wherein each of the plurality of networked devices are configured to wireless transmit audio;
wherein the server receives information concerning a set of wireless peripherals each configured to receive audio;
the server analyzes the received information about the set of wireless peripherals to generate a set of initial pairings between one of the plurality of networked devices and one of the wireless peripherals;
the server configured to transmit an audio challenge to each of the wireless peripherals via the wireless connection between each of the wireless peripherals and each of the plurality of networked devices;
wherein the server receives a set of inputs via one or more of the plurality of networked devices in response to the audio challenges;
the server analyzes the set of inputs and generates a set of suggested pairings between one of the plurality of networked devices and one of the wireless peripherals, wherein each of the suggested pairings comprises a confidence value;
for each suggested pairing, if the confidence value for a suggested pairing exceeds a threshold value, the server causes the wireless peripheral and the networked device to be associated;
wherein at least one of the suggested pairings comprises an incorrect pairing that comprises a networked device of the plurality of networked devices that is an unintended match to the wireless peripheral and another networked device of the plurality of networked devices is the intended match;

the server further configured to determine a match to each of the wireless peripherals relative to one or more of the plurality of networked devices; and for the incorrect pairing, the processor configured to (i) synchronize an audio transmission from the networked device of the incorrect pair with the networked device that is the intended match to the wireless peripheral and (ii) map an audio transmission from the networked device of the incorrect pair to the wireless peripheral of the incorrect pair based on the synchronization.

15. A system for pairing devices of a network with wireless peripherals, comprising:

a server comprising a processor and memory;

a plurality of networked devices communicatively coupled with the server via a wired or wireless network, wherein the memory stores an approximate location of each of the networked devices, and wherein each of the plurality of networked devices are configured to wirelessly transmit audio;

wherein the server receives information concerning a set of wireless peripherals each configured to receive audio;

the server analyzes the received information about the set of wireless peripherals to generate a set of initial pairings between one of the plurality of networked devices and one of the wireless peripherals;

the server configured to transmit an audio challenge to each of the wireless peripherals via the wireless connection between each of the wireless peripherals and each of the plurality of networked devices;

wherein the server receives a set of inputs via one or more of the plurality of networked devices in response to the audio challenges;

the server analyzes the set of inputs and generates a set of suggested pairings between one of the plurality of networked devices and one of the wireless peripherals, wherein each of the suggested pairings comprises a confidence value;

for each suggested pairing, if the confidence value for a suggested pairing exceeds a threshold value, the server causes the wireless peripheral and the networked device to be associated;

wherein at least one of the suggested pairings comprises an incorrect pairing that comprises a networked device of the plurality of networked devices that is an unintended match to the wireless peripheral and another networked device of the plurality of networked devices is the intended match;

the server further configured to determine a location of each of the wireless peripherals relative to one or more of the plurality of networked devices; and for the incorrect pairing, the processor configured to (i) cause the wireless peripheral to be unlinked with the networked device of the incorrect pairing and (ii) cause the wireless peripheral to be paired with the networked device that is closer to the location of the wireless peripheral.

* * * * *